United States Patent [19]

Chu et al.

[11] 3,929,591

[45] Dec. 30, 1975

[54] NOVEL LITHOGRAPHIC PLATE AND METHOD

[75] Inventors: Simon Long Chu, Dobbs Ferry; Ken-Ichi Shimazu, Pleasantville, both of N.Y.

[73] Assignee: Polychrome Corporation, Yonkers, N.Y.

[22] Filed: Aug. 26, 1974

[21] Appl. No.: 500,438

[52] U.S. Cl. .................. 204/17; 204/33; 204/129.9

[51] Int. Cl.[2] ........................ B41C 3/08; C25D 5/44

[58] Field of Search ........ 204/33, 17, 129.9, 129.95

[56] References Cited

UNITED STATES PATENTS

| | | | |
|---|---|---|---|
| 3,041,259 | 6/1962 | Stoddard | 204/33 |
| 3,073,765 | 1/1963 | Adams | 204/33 |
| 3,330,743 | 7/1967 | Jestl | 204/33 |
| 3,834,998 | 9/1974 | Watanabe | 204/58 |

*Primary Examiner*—T. M. Tufariello

[57] ABSTRACT

Aluminum base sheets for lithographic plates are produced which have been surface grained followed by electrolytically etching the surface utilizing alternating current in a phosphoric acid electrolyte and then anodizing the surface with direct current in a sulfuric acid electrolyte.

9 Claims, No Drawings

NOVEL LITHOGRAPHIC PLATE AND METHOD

This invention relates to the preparation of supporting base members for lithographic printing plates and more particularly to grained aluminum sheet members having a whitish grey color of controlled intensity and a relatively large surface area.

The art of lithographic printing depends upon the immiscibility of grease and water, upon the preferential retention of a greasy image-forming substance by an image area, and upon the similar retention of an aqueous dampening fluid by a non-image area. When a greasy image is imprinted upon a suitable surface and the entire surface is then moistened with an aqueous solution, the image area will repel the water and the non-image area will retain the water. Upon subsequent application of greasy ink, the image portion retains ink whereas the moistened non-image area repels it. The ink on the image area is then transferred to the surface of a material on which the image is to be reproduced, such as paper, cloth and the like, via an intermediary, a so-called offset or blanket cylinder, which is necessary to prevent mirror-image printing.

The type of lithographic plate to which the present invention is directed has a coating of a light-sensitive substance that is adherent to an aluminum base sheet. If the light-sensitive coating is applied to the base sheet by the manufacturer, the plate is referred to as a "presensitized plate". If the light-sensitive substance is applied to the base by the lithographer or trade platemaker, the plate is referred to as a "wipe-on" or "deep etch" plate. Depending upon the nature of the photosensitive coating employed, the treated plate may be utilized either to reproduce directly the exposed image, in which case it is termed a positive-acting plate, or to produce an image complementary to the one to which it is exposed, in which case it is termed a negative-acting plate. In either case the image area of the developed plate is oleophilic and the non-image area is hydrophilic.

In the case of a negative plate that is exposed to light through a negative transparency, the light-sensitive material, commonly a diazo compound, is caused to harden and thereby become insoluble in a desensitizing solution which is applied to the plates after light exposure to remove that part of the light-sensitive coating which, because it was protected from the light by the negative, was not light-hardened. The light-hardened surface of a negative plate will be the oleophilic surface compatible with the greasy ink and is called the "image-area"; the surface from which the non-hardened light-sensitive material has been removed by a desensitizer will be, or can be converted to, a hydrophilic surface having little affinity for the greasy ink and is called the "non-image" area.

A positive plate is generally one upon which the non-image area is the portion of the light-sensitive diazo compound exposed to light while the unexposed portion is either oleophilic or adapted to be converted by chemical reaction to a hardened oleophilic ink-receptive image area.

In coating a metallic plate with a light-sensitive material, however, it is often highly desirable initially to provide the metal with a hydrophilic surface to which the light-sensitive coating adheres and which becomes the ink-repulsive non-image area upon removal of the unconverted, unhardened light-sensitive material. It is known to produce such hydrophilic surfaces on metallic plates for planographic printing purposes by various procedures.

It has been a problem in the art to provide a treatment for metallic plates that would cause a metallic plate to be strongly bonded to a subsequently applied light-sensitive compound so that very large numbers of prints, e.g., in excess of 100,000 prints, can be obtained consistently from relatively inexpensive lithographic plates. Some of the treatment known to the art by which aluminum base sheets have been made more receptive and adherent to light-sensitive overcoats include sand blasting, brush-graining, chemical etching and marbling the plate surface.

Anodizing the surface of the metal base sheet material of a lithographic plate, especially an aluminum sheet, provides certain advantages. Aluminum and other common photographic and lithographic base sheet metals are relatively soft and do not have high resistance to abrasion and corrosion. The oxides of such metals, such as formed on the surface by anodizing, however, in general are harder and more resistant to abrasion, wear and corrosion. Additionally, such oxidized surfaces tend to have as good or better hydrophilic and oleophobic characteristics, both of which are highly desirable in lithographic printing plates, than the unanodized metal surfaces.

Additionally, as disclosed in U.S. Pat. application Ser. No. 362,359, filed May 21, 1973, aluminum base sheets having an improved surface hardness and a dull grey color to reduce halation can be manufactured by first graining the surface using a wet graining mass, such as pumice, followed by anodizing the sheet with direct current in a sulfuric acid bath.

However, in carrying out this process some of the abrasive material remains embedded in the surface of the aluminum base sheet. These and other imperfections introduced into the surface during the graining operation tend to become exaggerated during the subsequent anodization step. Fine control of the dull grey color becomes difficult and generally the color and surface area produced is non-uniform and non-reproducible.

It is important to be able to control the degree of surface darkness. The amount of exposure necessary to produce the image areas on the plate are in part dependant upon the darkness of the surface of the base sheet. When the degree of darkness cannot be controlled, it is difficult to produce plates having predetermined exposures. In this event, it would be necessary to test each separate production lot of lithographic plates by making trial exposures until the proper exposure is determined. These imperfections can be removed by chemically etching the grained sheets prior to anodization. Suitable chemical etching agents include sodium hydroxide and ammonium bifluoride. This process removes the abrasives from the surface and produces a lighter, whitish grey surface color on the aluminum sheet. The surface darkness can be controlled and may still be of sufficient intensity to serve as an anti-halation layer. Additionally a presentitized plate manufactured from such aluminum sheet has been found to have greater sensitivity and the developed plates run cleaner on the press.

Additionally, it is sometimes desirable to have a lighter surface color on the base sheet. A lighter surface color on the base sheet will lead to a "faster" lithographic plate made therefrom, i.e., one which requires less exposure than a darker plate. It is preferable to have a whiter substrate color when using certain sensitizers. Generally, additive plates with thin coatings of diazo compounds are quite "fast" and require a relatively dark background to prevent halation. Thicker photopolymer type plates are relatively "slow," requiring more light for the exposure. The exposure time of such a plate can be decreased by the use of a lighter substrate. In such cases, halation is also less of a problem.

There is also greater contrast between the substrate and the image areas of the finished plate. Thus it is easier to visually inspect the data recorded on the plate.

The chemical etching process has the drawback that it is difficult to finely control the amount of etch, and the plates tend to become too white. In addition, the surface area of the aluminum sheet is undesirably reduced due to etching out of some of the fine grain structure in the surface eliminating the benefits of mechanically grained plates.

Accordingly, it is an object of this invention to provide an improved supporting base for lithographic plates. Another object of this invention is to provide an improved anodized aluminum supporting base for lithographic plates. It is also an object of this invention to provide improved presensitized anodized aluminum lithographic plates. Still another object of this invention is to provide an improved supporting base for presensitized and wipe-on lithographic plates that has inherent antihalation characteristics with an improved sensitivity. And it is a further object to provide an improved supporting base for lithographic plates which has a reproducible surface of relatively large area.

It is an object to provide an improved process for the production of supporting bases for lithographic plates which has fewer steps than prior commercial processes. It is a further object to provide a process which allows greater control of the process steps and is less dependent on temperature and concentration variations than are usual commerical etching processes.

These and other objects will become apparent from the following detailed disclosure of this invention.

It has been discovered that the foregoing objects can be achieved, and lithographic plates fulfilling those objects can be prepared, by electrolytically etching sheets of aluminum commonly used as base sheets for lithographic plates, which sheets have been previously roughened. In particular, aluminum sheets that are roughened and electrolytically etched as disclosed herein and subsequently anodized have been found to be exceptionally superior as supporting bases for presensitized and for wipe-on lithographic printing plates. The aluminum sheet thus anodized then can be coated with a light-sensitive material, such as a diazo or other material known and commonly used in the lithographic art.

Prior to this invention, anodized sheets tended to have a dull, lustrous whitish matte finish which would cause halation unless masked, for example, by a dye or other colored coating. The aforementioned grained and anodized sheets had a hardened surface, which was dull, steel-grey and non-lustrous. Lithographic printing plates made from such treated aluminum sheets were found to be capable of a substantially longer useful press life and were substantially or entirely free of halation without dyeing or other special treatment. The inclusion of the electrochemical etching step of this invention produces an aluminum base sheet which has a substantially greater surface uniformity and which has fewer or no embedded particles of the graining abrasive. The strength of the bond between the base sheet and the light sensitive overcoat is thus increased. While the surface coloration of the sheets of this invention is somewhat more whitish or lighter than that of base sheets which have only been grained and anodized, there is still substantially no halation in the finished plate.

"Halation" in the reprographic art and particularly in the lithographic art, connotes the phenomenon of imperfect light exposure onto the light-sensitive coated surface of a print or printing sheet caused by light passing through the coating and being reflected by the underlying supporting base back to the light-sensitive coating. The reflected light activates the coating, and because the reflected light is usually very dispersed, causes fuzzy, un-sharp image boundaries resulting in poor quality prints, printing plates and copies printed with such plates. The plates of this invention inherently have little or no reflectivity and therefore cause virtually no halation so that clear, sharp images are obtained without the need of special masking treatment.

The aluminum used as the base sheet is preferably 99 percent or more pure. Aluminum alloys, for example, the No. 1100, No. 3003 or No. 1145 alloys and others wherein the aluminum is combined with a small percentage of manganese and/or copper also are suitable. Purer alloys than those two types do not presently appear to have any advantage because they tend to have less mechanical strength and to be higher in cost.

Methods of roughening lithographic plate base sheets are known and commonly used. Plates can be roughened in a variety of ways, including mechanically by rubbing with an abrasive, by sand blasting and by wire brushing, chemically by treatment with various solutions and electrochemically. Although roughening the surface tends to improve the bonding of the overcoated light-sensitive layer to the metal base, the roughened metal surface is substantially unchanged in terms of its softness, susceptibility to corrosion and reflectivity. Moreover conventional mechanical, chemical and electrochemical roughening do not, after etching and anodizing, produce the hard, lusterless surface obtained according to this invention.

It has been found to be preferable that the roughening be performed by graining the aluminum base sheet with a wet mass of fine hard abrasive particles. When this step is followed by electrochemical etching and anodizing as disclosed below there is produced a remarkably distinct change in the character of the plate surface, namely, to a lusterless whitish or light to medium dull grey color of controllable uniformity that is hard and resistant to abrasion and corrosion, and that has little halation. Graining of the sheet can be done by hand or by machine, and requires only that the wet mass of particles be moved on the sheet surface an amount sufficient, considering speed and force, to create the fine scoring and roughening of the surface of a grained plate. Accordingly, the wet mass can vary in consistency from a dampened or moistened state to a slurry or suspension of the particles, depending on the particular mode of graining selected. After graining, the plate is rinsed and, if desired, chemically cleaned prior to subsequent anodizing. The graining mass can be made up of a variety of fine, hard and abrasive particles. By hard and abrasive is meant materials that are harder than the aluminum surface to be grained so as to score and roughen the surface as applied thereto. A variety of materials are suitable for the purpose, including various silicates, oxides, sulfates and others, for example silicon dioxide as sand, aluminum, potassium and sodium silicates as pumice, aluminum oxide and magnesium sulfate minerals. Of such graining materials, pumice is preferred because of its availability, cost and efficacy.

After the base sheets have been roughened, they are electrochemically etched utilizing alternating current and a phosphate ion containing electrolyte.

It is possible to utilize a wide range of phosphate compounds, such as water soluble mono- and dibasic alkali and alkaline earth phosphates, mono- and dibasic ammonium phosphate and phosphoric acid.

The electrolyte concentration should be in the range of about 20 to about 50 percent by weight, and preferably from about 20 to about 25 percent. If a lower level of phosphoric acid is utilized, the efficiency of the process is diminished. This is possible due to a higher electrical resistance of the solution. If an excess amount of phosphoric acid is used, there may be an increase in chemical, as distinguished from electrochemical etching. The result will be loss of latitude in controlling the greyness by the mechanism of altering the current density.

It is preferable that the temperature be maintained in the range of about 40°C to about 60°C during the etching process. While the lower limit is not critical, the efficiency of the process is reduced when the temperature is substantially below this range. Thus this temperature represents a lower practical limit on the process.

Should the temperature of the system rise much above the indicated range, then there may be a substantial amount of chemical etching, which, as previously described, is undesirable.

When using a phosphate ion containing electrolyte other than phosphoric acid, the relative lesser activity of these substances allows the method to be performed at temperatures somewhat elevated from the indicated range.

It has been found that there is substantially no chemical etching up to at least 70°C when using these compounds.

The electrolytic etching time will depend upon the temperature and the current density being utilized. It is to be understood that when the electrolyte solution is cooler, a longer time of etch will be required. Similarly, to achieve the same amount of etching the time of etch must be shorter when using a higher current density.

The current density and time are manipulated to attain the degree of whiteness desired. Greater current densities, and larger etching times produce a relatively whiter plate.

It has been found that a current density of about 10 to about 200 amperes per square foot applied for about 1 minute will produce a final reflectance within the desired range of about 40 to 60. It is to be understood that the reflectance refers to that obtained after the subsequent anodization and not that immediately after the etch step. It is preferred that there be an increase in reflectance of at least about 5 percent, preferably at least 10 percent over the similarly treated aluminum which has not had the electrolytic etching. Preferably that increase is at least 15 to 20 percent.

Electrolytic etching results in a weight loss and the degree of etch is controlled by increasing or decreasing this total current. If a whiter plate is desired, then a greater current density should be used and conversely if less etching is desired, then a lesser current density should be utilized.

If the current density is too large, there will be too great a degree of etching, which will unduly reduce the surface area of the plate by eliminating many of the small "hills" formed in the graining operation. The plate will also be very light and susceptible to halation. If too small a current density is used, then the surface will not achieve the desired uniformity.

After the etching, the aluminum sheets desirably are rinsed with water. Conventional chemical etching processes leave a residual "smut" on the surface of the sheet. This must be removed by rinsing with water, immersing in an acid bath and rinsing again. As no smut is produced by the process of this invention, no chemical treatment is necessary.

After the base sheets have been grained and electrolytically etched, they are anodized. The sheets are the anodes in an anodizing tank in which sulfuric acid is the preferred electrolytic medium. The sulfuric acid solution strength preferably is in the order of about 15% by weight of acid in water, but can vary within a wider range, for example, between about 8 and about 22 percent, depending largely on practical and economic considerations. The electrolyte temperature does not appear to be critical, although at or slightly higher than ordinary room temperature seems to be sufficient and practically desirable. Agitation of the electrolyte, for example, by a flow of air through it, also is desirable. Good results can be obtained using a voltage in the anodizing system of about 14 to about 15 volts, although a wider range of voltage can be used, e.g., from about 10 to about 25 volts. Preferably the area of the anodic sheet surface should be about the same as the surface area of the cathode. The latter surface can be a lead-lined tank or a lead coil which can also serve, along with air agitation, to cool the electrolytic solution. A fiberglass tank can be used. A current density of about 15 amperes per square foot of work is desirable, although the current density also may vary within a wider range, for example, from about 10 to about 20 amperes per square foot. The anodizing time will vary depending on the foregoing factors. At the presently preferred conditions, i.e., about 15 percent sulfuric acid concentration, about 70° to 75°F, about 15 volts direct current, and about 15 amperes per square foot current density, good anodizing of grained aluminum sheets is obtained in about 2 minutes.

Because only one side of the sheet ordinarily is used as a lithographic surface, it is efficient to anodize two sheets simultaneously by tightly clamping them together so they act as a single anode and only their outer exposed grained surfaces are anodized. After anodizing the plates are rinsed, for example in cold water, for a brief period of time. Mild neutralizing solutions can also be used, if desired, prior to rinsing the plates.

The surfaces of the plates thus prepared have a metallic oxide coating that is very hard, abrasion resistant and porous. The surfaces, however, do not have the dull, lustrous, whitish matte finish either of anodized plates that have not been pregrained or grained but unanodized sheets. Nor do they have the relatively uneven dull steel grey tone of plates prepared by graining and anodizing without etching. Instead, they have a non-lustrous, whitish or light-to-medium grey tone having a reflectance reading preferably in the range of about 40 to about 60. The relative intensity of the surface tone can be controlled in the aforementioned manner.

If a negative working coating, i.e., one in which the part exposed to the ultraviolet light is hardened, is to be applied, it is desirable to treat the anodized surface, which is to receive the coating of a light-sensitive material, with an undercoating substance that forms a strong bond with the base sheet material and with the light-sensitive coating material. Many such undercoating treatments are known in the art and commonly used for longer running lithographic plates, and can be used on the sheets of this invention. U.S. Pat. Nos. 3,160,506, 3,136,636, 2,946,683, 2,922,715 and 2,714,066 disclose a variety of suitable materials for undercoating bonding substances onto plates and methods for applying them. Alkali silicate, silicic acid, alkali zirconium fluoride and hydrofluozirconic acid solutions presently are the most important commercial bonding substances. Those materials substantially improve the bonding of the light-sensitive coating to the underlying metallic base which otherwise generally tends to have inadequate affinity for the coating. Of the various known bonding materials, the alkali zirconium fluorides, such as potassium zirconium hexafluoride and hydrofluozirconic acid disclosed in U.S. Pat. Nos. 3,160,506 and 2,946,683, are especially satisfactory for preparing pre-grained anodized aluminum bases to receive a light-sensitive coating and are, therefore, preferred. The pre-coating treatment of the pre-grained anodized plates can be done according to the methods and under the conditions known in the art, as described in the above-mentioned patents, whose disclosures are specifically incorporated herein by reference.

If a positive working coating, such as one disclosed in U.S. Pat. No. 3,635,709 are to be applied, this treatment is not advantageous.

It presently appears that the light-sensitive compounds and compositions known in the lithographic art as being suitable for coating onto aluminum bases are suitable for use on the pregrained anodized base sheets according to this invention. Typical examples of such light-sensitive compounds and compositions include so-called tannable colloids, for example, albumin, casein, starch and synthetic film-forming resins such as polyvinyl alcohol and polyvinyl acetate that contain a dichromate sensitizer; photopolymerizable materials that are polymerizable by photoinitiators such as carbonyl, organo-sulfur, peroxide and organo-halo containing compounds; diazo compounds such as diazobenzenes, diazo-naphthalenes, diazo-aminobenezes, diazo-diphenylamines and diazo-mercaptobenzenes; aromatic diazido compounds such as diazido-diphenylmethane carboxylic acids, azido-styrylketones, benzoquinone diazides, naphthoquinone diazides and resin like esters of sulfonic acids of the latter with phenolformaldehyde or acetonepyrogallol condensation products; acenaphthenes; sulfanilido-methylene-fluorenes; S-alkylthiodiarylamine perchlorates; iodonitrothiophenes; and nitronaphthalenes; including carboxylic and sulfonic acid derivatives.

For making presensitized lithographic plates, certain of the above-mentioned kinds of light-sensitive compounds and compositions presently are preferred. They include generally the diazo compounds, and more particularly diazo-diphenylamine, substituted diazo-diphenylamine, condensation products of diazo-diphenylamines with compounds having reactive carbonyl groups, such as formaldehyde and paraformaldehyde, and unresinified light-sensitive reaction products of diazo-diphenylamine or condensation products thereof with hydroxyl containing aromatic coupling agents; esters of diazo-naphthol sulfonic acids with condensation products of pyrogallol and acetone; and condensation products of quinone - (1,2) - diazide sulfonic acid halides with phenolformaldehyde resins.

U.S. Pat. Nos. 2,714,066; 2,922,715; 2,946,683; 3,300,309; 3,591,575; 3,635,709; and 3,589,898 describe negative or positive working sensitizers which may be used.

Although the making of lithographic plates according to this invention will be apparent to persons skilled in the art from the foregoing disclosure, the following specific examples are set forth to further illustrate the invention.

The aluminum sheets used for the following examples are all of about 16 square inch size. They are degreased and cleaned in a mild solution of sodium hydroxide and then brushed with a slurry of pumice until one surface of each sheet is uniformly grained.

The thus grained sheets are then electrolytically etched using a graphite counterelectrode, as described below.

After etching, the sheets are rinsed and subjected to a sulfuric acid anodization at 20 ampere minutes per square foot, with a sulfuric acid concentration of 15 percent.

A similarly treated aluminum sheet without the alternating current etching step has a reflectance reading of 22.

EXAMPLE 1

The plates are electrochemically etched with alternating current in a 20 percent phosphoric acid electrolyte for 1 minute at a current density of 80 amperes per square foot. The following reflection readings are obtained at the specified temperatures.

| T (°C) | Reflectance Reading |
|---|---|
| 30 | 30 |
| 40 | 40 |
| 50 | 47 |
| 60 | 55 |

The reflectance readings for this and subsequent Examples were all taken after the anodization step.

EXAMPLE 2

Example 1 is repeated maintaining the temperature constant at 50°C and varying the current density.

| Current Density (Amp/Sq. Ft) | Reflectance Reading |
|---|---|
| 16 | 40 |
| 40 | 45 |
| 80 | 47 |
| 160 | 62 |

EXAMPLE 3

Example 1 is repeated holding the temperature at 50°C and current density at 80 amperes per square foot. The etching time is varied.

| Time (sec) | Reflectance Reading |
|---|---|
| 30 | 40 |
| 60 | 47 |
| 120 | 49 |

EXAMPLE 4

Example 1 is repeated except that the phosphoric acid concentration is varied, with the temperature held constant at 50°C.

| Concentration (w/w%) | Reflectance Readings |
|---|---|
| 5 | 36 |
| 10 | 42 |
| 20 | 47 |
| 30 | 51 |

EXAMPLE 5

Example 1 is repeated utilizing different electrolyte materials.

| Compound | T(C°) | Reflectance Readings |
|---|---|---|
| dibasic ammonium phosphate | 50 | 42.5 |
| monobasic ammonium phosphate | 50 | 42.5 |
| monobasic sodium phosphate | 70 | 43.1 |

It is of course to be understood that the foregoing examples are intended to be illustrative of the invention described, and that numerous changes can be made in the ingredients, conditions and proportions set forth therein without departing from the scope of the invention as disclosed above and defined in the claims appended hereafter.

What is claimed is:

1. A method for preparing an aluminum sheet base member for a lithographic printing plate, the surface of which is adapted to receive a light sensitive coating thereon, which comprises:

a. Graining the surface of said aluminum sheet by treatment thereof with a wet mass of fine, hard, abrasive particles, selected from the group consisting of silicates, oxides and sulfates; and b. Etching said grained aluminum sheet by treatment thereof with alternating current in an aqueous electrolytic solution comprised of from 20 to about 50 percent by weight of phosphate electrolyte selected from the group consisting of alkali phosphates, alkaline earth phosphates, ammonium phosphate and phosphoric acid, and wherein the alternating current density is from about 10 to 200 amperes per square foot; said etching sufficient to increase the final surface reflectance of said aluminum sheet by at least about 5 percent; and c. Anodizing said etched aluminum sheet by treatment with direct current in an aqueous electrolyte solution comprised of from 8 to 22 percent by weight of sulfuric acid, and wherein the direct current voltage is from 10 to 25 volts, and the current density is from 10 to 20 amperes per square foot, to provide a hard, abrasion resistant, porous surface on said aluminum sheet.

2. The method of claim 1, wherein in step b., the phosphate electrolyte is phosphoric acid.

3. The method of claim 1, wherein in step a., the wet mass is comprised of pumice.

4. The method of claim 1, wherein in step a., the fine, hard, abrasive particles are selected from the group consisting of silicon dioxide, aluminum silicate, potassium silicate, sodium silicate, aluminum oxide and magnesium sulfate.

5. The method of claim 1, wherein in step b., the phosphate electrolyte is phosphoric acid and is present in a concentration of from about 20 to 25 percent weight.

6. A lithographic printing plate which comprises an aluminum base sheet prepared according to the process of claim 1, and having a light sensitive coating applied to the treated surface thereof.

7. The lithographic plate of claim 6, wherein the light sensitive coating includes a diazo compound.

8. The method of claim 1, wherein in step c., the temperature of the solution is maintained at from 20° to 25°C.

9. The method of claim 1, wherein in step b., the electrolyte solution is maintained at a temperature of from 40° to 60°C.

* * * * *